US012770449B2

(12) United States Patent
Kelleher et al.

(10) Patent No.: US 12,770,449 B2
(45) Date of Patent: Oct. 20, 2026

(54) ACCESS CONTROL BARRIER

(71) Applicant: Ford Global Technologies, LLC, Dearborn, MI (US)

(72) Inventors: Jamie Kelleher, Rayleigh (GB); Richard David Balch, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/790,404

(22) Filed: Jul. 31, 2024

(65) Prior Publication Data

US 2025/0046137 A1 Feb. 6, 2025

(30) Foreign Application Priority Data

Jul. 31, 2023 (EP) .................................... 23188810

(51) Int. Cl.
*G07C 9/10* (2020.01)
*G08B 21/18* (2006.01)

(52) U.S. Cl.
CPC ............... *G07C 9/10* (2020.01); *G08B 21/18* (2013.01)

(58) Field of Classification Search
CPC .. G07C 9/10; G07C 9/38; G08B 21/18; E01F 13/028; E01F 9/608; E01F 9/65; B66B 13/00; B66B 3/00; H04L 67/06; H04L 67/12; H04L 67/125
See application file for complete search history.

(56) References Cited

U.S. PATENT DOCUMENTS

| | | | | |
|---|---|---|---|---|
| 10,021,203 | B2 * | 7/2018 | Papakipos | H04L 67/52 |
| 2017/0131104 | A1 * | 5/2017 | Carter | G01C 21/206 |
| 2020/0242519 | A1 | 7/2020 | Callahan | |
| 2025/0014402 | A1 * | 1/2025 | Ovaska | G07C 9/00571 |

FOREIGN PATENT DOCUMENTS

| | | | | |
|---|---|---|---|---|
| EP | 0352071 | A1 | | 1/1990 |
| GB | 2221797 | A | | 2/1990 |
| JP | 2002-363933 | A | | 12/2002 |
| JP | 4398604 | B2 | * | 1/2010 |
| KR | 10-2355156 | B1 | | 1/2022 |
| WO | 2019/007810 | A1 | | 1/2019 |

* cited by examiner

*Primary Examiner* — Quan Zhen Wang
*Assistant Examiner* — Rajsheed O Black-Childress
(74) *Attorney, Agent, or Firm* — HG LAW LLP

(57) ABSTRACT

An access control barrier is provided. A sensor of the barrier detects at least one of the receiving of a movable barrier element of the barrier at a receiver portion of the barrier and the removal of the movable barrier element from the receiver portion. A transmitter of the barrier transmits an indication of a change of barrier status to a server responsive to the sensor detecting at least one of the receiving of the movable barrier element at the receiver portion and the removal of the movable barrier element from the receiver portion.

19 Claims, 6 Drawing Sheets

200
Server
204
I/O Path
212
Control Circuitry
210
Processing Circuitry
216
Storage
214
Content Database
206
Communication Network(s)
208
Computing Device
202
Control Circuitry
218
Storage
228
Processing Circuitry
230
I/O Path
220
Speaker
222
Display
224
User Input Interface
226
Computing Device
203
Control Circuitry
219
Storage
229
Processing Circuitry
231
I/O Path
221

ACCESS CONTROL BARRIER

CROSS-REFERENCE TO RELATED APPLICATIONS

This application claims priority of EP patent application Ser. No. 23/188,810.8, filed Jul. 31, 2023, the contents of which is hereby incorporated by reference herein in its entity.

BACKGROUND

The present disclosure relates to methods and systems for an access control barrier. Particularly, but not exclusively, the present disclosure relates to an access control barrier for pedestrians.

SUMMARY

Facilities such as train stations, office buildings, shopping centers, hotels, restaurants, schools, hospitals, and so on, often comprise amenities such as lifts, escalators, toilet facilities, and so on, where some users may particularly require use of those facilities. For example, some users will require the use of lifts provided in a facility in order to enter into the facility, as they are unable to use entry systems such as stairs. It may be inconvenient for a user to travel to a facility to find that the amenities of the facility that they require are not currently accessible. A need therefore exists to provide a means for alerting users to a closed status of an amenity.

Systems and methods are provided herein for enabling the provision of dynamic information regarding the status of amenities of a facility. Amenities such as elevators, escalators, and toilet facilities are often equipped with barriers, such as belt barriers, that can be used in order to prevent access of users to those amenities when necessary. By detecting the opening or closing of the barrier associated with an amenity of a facility, and transmitting an indication of the status of the barrier to a server, information which may be accessed by users of the facility may accurately reflect the status of said amenities. Thus, a user may plan their route according to the status of amenities of facilities. In an example, where a user requires the use of an amenity such as a lift (e.g., to access a facility) due to a disability, the barrier as described herein may enable the user to determine whether they may use that facility in their route with a high degree of certainty.

According to the systems and methods described herein, an access control barrier is provided. For example, a barrier that creates boundaries, restricts access, or guides pedestrian flow within a designated area (e.g., a facility) is provided. The access control barrier (e.g., barrier) may, for example, be a pedestrian access control barrier and/or a crowd control barrier and/or a vehicle access control barrier and/or a traffic access control barrier. The barrier comprises a movable barrier element and a receiver portion configured to receive the movable barrier element. For example, the movable barrier element may be a flexible element, such as a belt, strap, or rope, comprising an end portion configured to attach to the receiver portion. The barrier further comprises a sensor which detects at least one of the receiving of the movable barrier element at the receiver portion and the removal of the movable barrier element from the receiver portion. For example, the sensor may be a passive element that is activated upon reception of the movable barrier element at the receiver portion. Additionally, or alternatively, the sensor may be a sensor configured to detect the tension and/or payout of the movable barrier element. For example, the sensor may be configured to detect a change in, or a particular value of, tension and/or payout when the movable barrier element is extended to and/or received at the receiver portion. The sensor may be configured to detect a change in, or a particular value of, tension and/or payout when the movable barrier element is removed from the receiver portion. The barrier further comprises a transmitter configured to transmit an indication of a change of barrier status to a server responsive to the sensor detecting at least one of the receiving of the movable barrier element at the receiver portion and the removal of the movable barrier element from the receiver portion.

In some examples, the indication of the change of barrier status is an indication of a closed status when the movable barrier element is received at the receiver portion. In some examples, the indication of the change of barrier status is an indication of an open status when the movable barrier element is removed from the receiver portion. For example, the barrier status may indicate whether the barrier, or an amenity associated with the barrier, is open or closed.

In some examples, the movable barrier element may comprise a moveable object, such as a cone or post, configured to cooperate with the receiver portion. For example, the receiver portion may be configured to be positioned or located on or at least partially within a surface, such as a wall or floor, and configured to support and/or locate the barrier element when attached.

In some examples, the barrier is a belt barrier, and the movable barrier element comprises a belt and a connecting portion configured to connect the belt to the receiver portion. In some examples, the barrier is a hand-operated barrier, whereby the movable barrier element is manually moved to the receiver portion. In some examples, the movable barrier element is a flexible barrier element.

In some examples, the barrier is associated with a location. For example, the barrier may be associated with a particular location within a facility. In some examples, the barrier is associated with an amenity. For example, the barrier may be used to prevent access to a particular amenity of a facility.

In some examples, the transmitter is battery powered. For example, the transmitter may require no additional power source. The transmitter may be activated (e.g., may receive power) responsive to the sensor detecting the change of status.

In some examples, the barrier is in communication with the server via an Internet of Things connection. For example, the barrier may be in communication with a system of interconnected devices (e.g., the devices may be a plurality of barriers).

According to the systems and methods described herein, there is provided a system comprising the barrier and the server. In some examples, the server receives the indication of the change of barrier status. In some examples, the server signals to a device a change in status of the barrier or a change in status of an amenity associated with the barrier responsive to receiving the indication. In some examples, the system may comprise a plurality of barriers in communication with the server.

In some examples, the system further comprises the device. In some examples, the device outputs a notification indicating a change in status of the barrier or a change in status of an amenity associated with the barrier responsive to receiving the signal indicating the status of the barrier or the status of the amenity associated with the barrier.

In some examples, the device comprises at least one of a digital sign (e.g., a sign within or associated with a facility), a user device (e.g., a smart phone, a tablet, a laptop, a smart watch, and so on), an audio output device (e.g., a smart speaker, a tannoy, and so on), and a further server (e.g., a server configured to control a website related to a facility).

In some examples, the barrier is located within a facility, and wherein the device is a user device associated with at least one of an authorized person of the facility, a user subscribed to receive updates related to the facility, and a user located in the vicinity of the facility.

In some examples, the barrier is located within a facility, and the server comprises or is in communication with a facility management system. For example, a facility management system may comprise or control information regarding the facility and may be configured to provide information regarding the facility to users, such as authorized users.

In some examples, the barrier is located within a facility, and wherein the device is comprised in or is in communication with a facility management system. For example, the device may be a user device which is connected to a Wi-Fi network associated with the facility management system, or may be a device which is connected to the facility management system, such as a user device assigned to a worker of the facility.

In some examples, a virtual mapping application of the device is configured to indicate the status of the barrier and/or an amenity associated with the barrier when the status is a closed status. For example, an image, or text, may be incorporated into a virtual map to indicate the status of the barrier.

In some examples, a route mapping application of the device is configured to utilize the status of the barrier and/or an amenity associated with the barrier when outputting a route. For example, a route mapping application may be configured to avoid a barrier or amenity associated with the barrier when a route is requested, for example, by providing an alternative route or route to an alternative amenity, when the status of the barrier is a closed status.

According to the systems and methods described herein, a barrier is configured to output an indication of a change of an open and/or closed status of the barrier.

According to the systems and methods described herein, a system comprises a plurality of barriers, wherein each barrier is configured to output an indication of a change of an open and/or closed status of that barrier.

According to the systems and methods described herein, an access control barrier is provided. The access control barrier comprises a movable barrier element and a receiver portion configured to receive the movable barrier element. The access control barrier further comprises a sensor configured to detect the receiving of the movable barrier element at the receiver portion. The access control barrier further comprises a transmitter configured to transmit an indication of a change of barrier status to a server responsive to the sensor detecting the receiving of the movable barrier element at the receiver portion.

According to the systems and methods described herein, an access control barrier is provided. The access control barrier comprises a movable barrier element and a receiver portion configured to receive the movable barrier element. The access control barrier further comprises a sensor configured to detect the removal of the movable barrier element from the receiver portion. The access control barrier further comprises a transmitter configured to transmit an indication of a change of barrier status to a server responsive to the sensor detecting the removal of the movable barrier element from the receiver portion.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
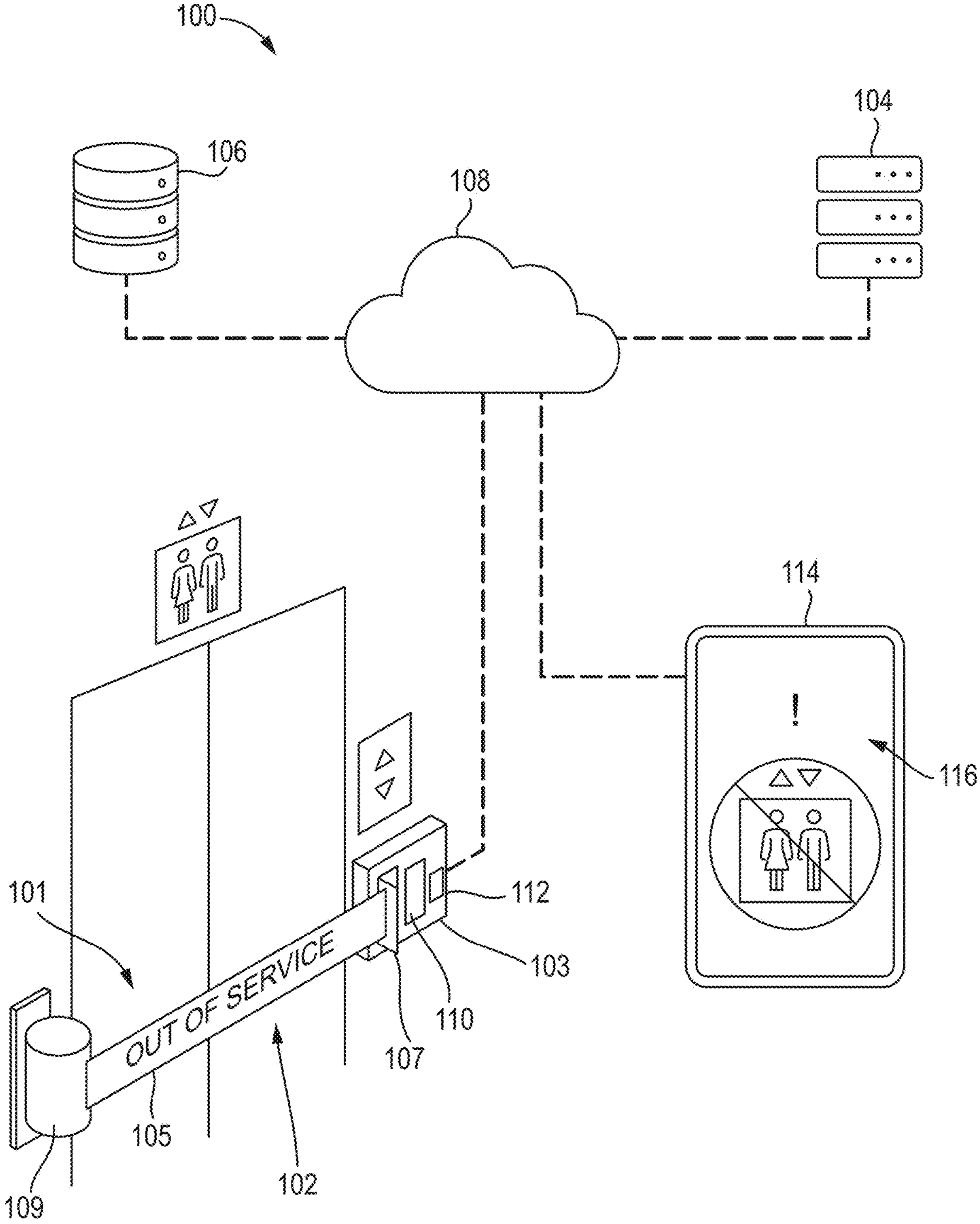
FIG. 1 illustrates an overview of the system for indicating a change of barrier status, in accordance with some examples of the disclosure.

FIG. 1 illustrates an overview of a system 100 for indicating a change of status of a barrier 101. In particular, the example shown in FIG. 1 illustrates a barrier 101 (e.g., an access control barrier) having a movable barrier element 102 and a receiver portion 103 configured to receive the movable barrier element 102. In this example, the barrier 101 is a belt barrier, where the movable barrier element 102 comprises a belt 105 and a connecting portion 107 configured to connect the belt 105 to the receiver portion 103. The barrier 101 further comprises a reel 109 which is configured to tension the belt 105, and allow the belt 105 to be extended and retracted. One end of the belt 105 is fixedly attached to the reel 109. A distal end of the belt 105 to the end of the belt fixedly attached to the reel 109 comprises the connecting portion 107 which is fixedly attached to the belt 105. In an open barrier state, the belt 105 is retracted into the reel portion 109. In a closed barrier state, the belt 105 is extended from the reel 109, and the connecting portion 107 is connected to the receiver portion 103. When the barrier 101 is in use, for example, is positioned at a particular location, such that the barrier may be operated in order to prevent access at a particular location or to a particular amenity, the reel 109 and the receiver portion 103 may be substantially fixed relative to one another. For example, each of the reel 109 and the receiver portion 103 may be fixed to a wall, or may each be fixed to a respective stanchion or post.

The barrier 101 of this example further comprises a sensor 110 which is configured to detect at least one of the receiving of the movable barrier element 102 at the receiver portion 103 and the removal of the movable barrier element 102 from the receiver portion 103. In some examples, the movable barrier element 102 and the receiver portion 103 are detachably attachable to one another via cooperating formations, which may be any suitable cooperating formations, such as a plug and socket, hook and loop, buckle and receiver, and so on. The connection or disconnection of the cooperating formations may activate a passive element comprised in the sensor 110. For example, the sensor 110 may comprise a passive element, such as a switch, provided at the receiver portion 103 of the barrier which is activated when the movable barrier element 102 is received at the receiver portion 103 and is activated when the movable barrier element 102 is removed from the receiver portion 103. A signal may be produced when the passive element is actuated, indicating that the movable barrier element 102 has been received at the receiver portion 103 or been removed from the receiver portion 103.

In another example, the sensor 110 is comprised in the reel 109 and is configured to detect the payout or tension of the belt. For example, the sensor 110 may be configured to detect an increase in tension when the belt is extended, for example, due to a spring mechanism or the like provided in the reel 109 and configured to tension the belt, which may be used as an indicator that the movable barrier element 102 is received at the receiver portion 103. The sensor 110 may be configured to detect a decrease in tension when the belt is retracted, which may be used as an indicator that the movable barrier element 102 has been removed from the receiver portion 103. In some examples, the sensor 110 may comprise a first sensor provided in the receiver portion 103 and a second sensor provided in the reel 109. The sensor 110 may be used in conjunction with or comprise control circuitry configured to determine whether the change in status is a change from an open status to a closed status, or a change from a closed status to an open status.

The barrier 101 of this example further comprises a transmitter 112 configured to transmit an indication of a change of barrier status to a server responsive to the sensor 110 detecting at least one of the receiving of the movable barrier element 102 at the receiver portion 103 and the removal of the movable barrier element 102 from the receiver portion 103. For example, the activation of the passive element, for example, by the engaging or disengaging of the cooperative formations, may further activate the transmitter 112 (e.g., may cause the transmitter 112 to power on, where the transmitter 112 may be powered via a battery), where the transmitter 112 may then transmit an indication of a change of barrier status to a server 104, for example, via a network 108. In some examples, the barrier 101 is communicatively coupled to the server 104 and a content database 106 via network 108. In some examples, the network 108 is an internet network accessed via a router or gateway, where the system 100 may be a system of interconnected devices (e.g., Internet of Things, IoT). The barrier 101 may be arranged at a particular location or in relation to a particular amenity. The transmitter 112 may additionally transmit metadata indicating the location of the barrier 101 and/or the amenity with which the barrier is associated, which may be stored, for example, in storage associated with the barrier 101. Additionally or alternatively, the transmitter 112 may transmit an identifier which may be used by the server to identify the barrier 101 and/or the location of the barrier, and/or the amenity with which the barrier 101 is associated, for example, by accessing the content database 106 where such information may be stored.

In some examples, the server 104 may utilize the received indication, for example, by signaling to a device 114 a change in status of the barrier or a change in status of an amenity associated with the barrier 101 responsive to receiving the indication. The server 104 may additionally receive an identifier identifying the barrier 101, such as a number. The server 104 may access the content database 106 which may comprise information on the association of the number identifying the barrier 101 with the location of the barrier or an amenity associated with the barrier. In other examples, the server 104 may receive metadata associated with the barrier 101, such as the location of the barrier 101 or an amenity with which the barrier is associated, which may be stored at the barrier 101. Responsive to the receiving of the indication of the change of status of the barrier 101 at the server 104, the server 104 may signal to a device a change in status of the barrier or a change in status of an amenity associated with the barrier.

In this example, the barrier 101 is arranged to prevent access to a lift. When the barrier 101 is in a closed position, the server may signal to a device 114 such as a smart phone that the status of an amenity has changed (e.g., is closed), where the device 114 may be configured to then output a notification 116 that the amenity with which the barrier is associated is not accessible. For example, users associated with a particular facility in which the amenity is provided (e.g., a building manager, a user in the vicinity of the facility such as a user determined to be located within the facility, a user who has subscribed to updates of a facility such as updates related to amenities of a train station, and so on) may receive a notification 116 at a user device 114 when the status of the amenities in such a facility changes. This may be particularly advantageous when the amenity is required for a user to access the facility, such as a lift in a train station, where in particular, a user who is unable to use alternative methods of entry, such as the stairs, may be forewarned, so that they are able to choose to take another route.

In this example, a notification 116 is output at a user device 114. However, it will be appreciated that in some examples, the indication of a change of barrier status may be used, for example, by an application at a device 114 such as a user device, such as a route mapping application, in order to take into account closure of amenities, or blockages of particular routes by the barrier 101, and to output a route that avoids the amenity or location blocked by the barrier 101. In some examples, the status of the barrier 101 or the amenity associated with the barrier 101 may be output to a mapping application, for example, to show the status of the barrier or amenity on a map output by the mapping application. In a further example, the server 104 may (itself or by communication with another server) output an indication of the status of the barrier 101 or an amenity by configuring a website to display the status.

In the example shown in FIG. 1, the device 114 is depicted as a smart phone. However, the device 114 may be any appropriate type of device which is able to present information to a user, such a computer, a tablet computer, a smartphone, a laptop, a smart watch, a smart speaker, a smart contact lens, extended reality devices, XR, or the like, used either alone or in combination, configured to display or otherwise output information. Furthermore, in the example shown in FIG. 1, there is only one barrier illustrated, however, it will be appreciated that there may be provided any number of barriers, each configured to indicate its status in the manner described in relation to the barrier 101 of FIG. 1.

Figure 2:
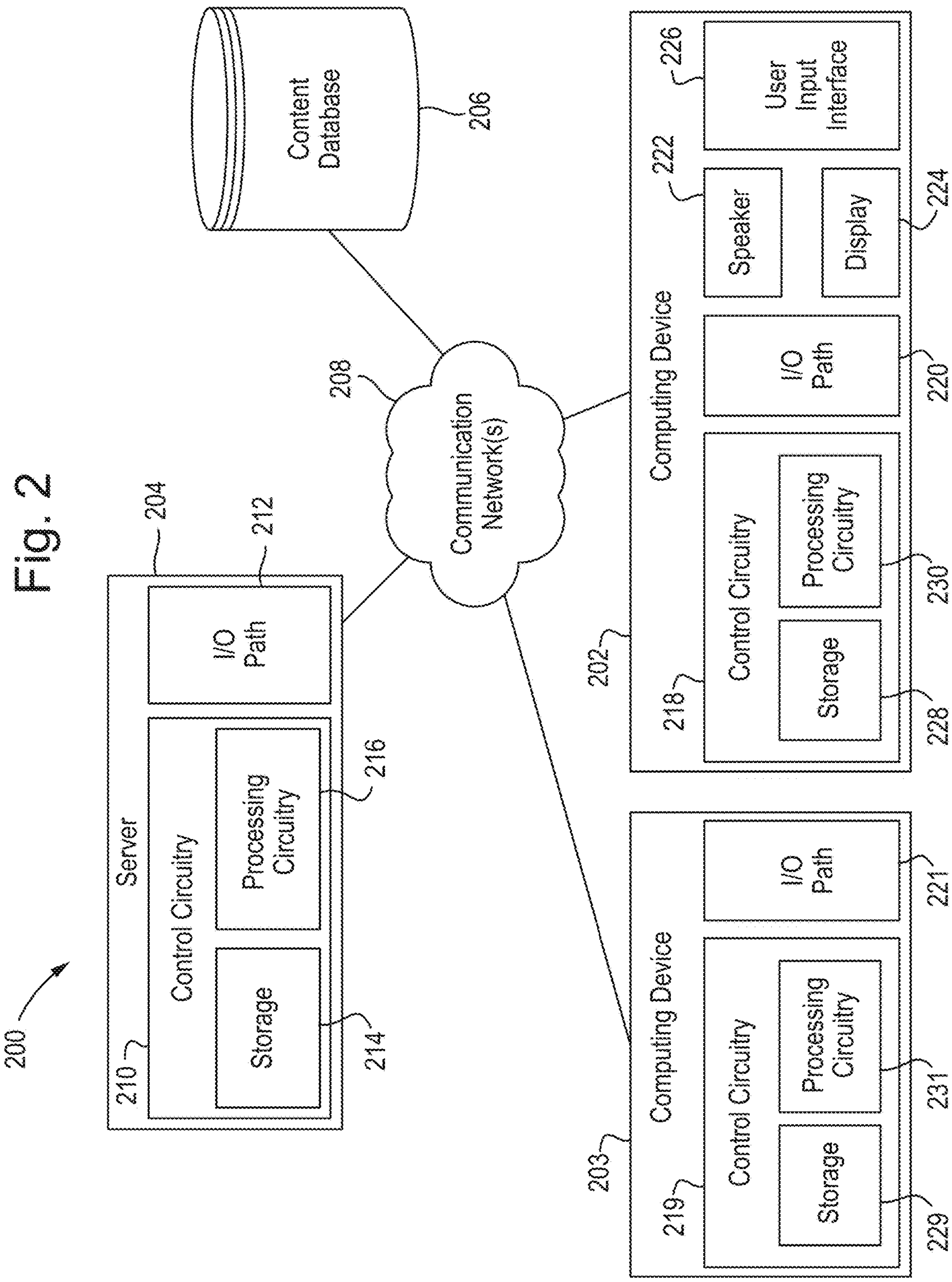
FIG. 2 is a block diagram showing components of an example system for indicating a change of barrier status, in accordance with some examples of the disclosure.

FIG. 2 is an illustrative block diagram showing example system 200, e.g., a non-transitory computer-readable medium, configured to indicate the status of a barrier 101. Although FIG. 2 shows system 200 as including a number and configuration of individual components, in some examples, any number of the components of system 200 may be combined and/or integrated as one device, e.g., as the barrier 101. System 200 includes computing device n-202 (denoting any appropriate number of computing devices, such as user device 114), computing device n-203 (denoting any appropriate number of computing devices, such as any number of barriers 101), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206 (and in some examples, computing device n-203). In still other examples, server n-204 works in conjunction with computing device n-202 and/or computing device n-203 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Computing device n-203, which may be a computing device comprised in or connected to the barrier 101, includes control circuitry 219, and I/O path 221. Control circuitry 219 includes storage 229 and processing circuitry 231. Control circuitry 210 and/or 218 and/or 219 may be based on any suitable processing circuitry such as processing circuitry 216 and/or 230 and/or 231. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, 229 and/or storages of other components of system 200 (e.g., storages of content database 106 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, or any other suitable fixed or removable storage devices, and/or any combination of the same. Each of storage 214, 228, 229 and/or storages of other components of system 200 may be used to store various types of content, metadata, and or other types of data. Non-volatile memory may also be used (e.g., to launch a boot-up routine and other instructions). Cloud-based storage may be used to supplement storages 214, 228, 229 or instead of storages 214, 228, 229. In some examples, control circuitry 210 and/or 218 and/or 219 executes instructions for an application stored in memory (e.g., storage 214 and/or 228 and/or 229). Specifically, control circuitry 210 and/or 218 and/or 219 may be instructed by the application to perform the functions discussed herein. In some implementations, any action performed by control circuitry 210 and/or 218 and/or 219 may be based on instructions received from the application. For example, the application may be implemented as software or a set of executable instructions that may be stored in storage 214 and/or 228 and/or 229 and executed by control circuitry 210 and/or 218 and/or 219. In some examples, the application may be a client/server 104 application where only a client application resides on computing device n-202 or n-203, and a server 104 application resides on server n-204.

The application may be implemented using any suitable architecture. For example, it may be a stand-alone application wholly implemented on computing device n-202, n-203. In such an approach, instructions for the application are stored locally (e.g., in storage 228, 229), and data for use by the application is downloaded on a periodic basis (e.g., from an out-of-band feed, from an Internet resource, or using another suitable approach). Control circuitry 218, 219 may retrieve instructions for the application from storage 228, 229 and process the instructions to perform the functionality described herein. Based on the processed instructions, control circuitry 218 may determine what action to perform when input is received from user input interface 226.

In client/server 104-based examples, control circuitry 218, 219 may include communication circuitry suitable for communicating with an application server 104 (e.g., server n-204) or other networks or servers. The instructions for carrying out the functionality described herein may be stored on the application server 104. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server 104-based application, control circuitry 218 runs a web browser that interprets web pages provided by a remote server 104 (e.g., server n-204). For example, the remote server 104 may store the instructions for the application in a storage device. The remote server 104 may process the stored instructions using circuitry (e.g., control circuitry 210) and/or generate displays. Computing device n-202 may receive the displays generated by the remote server 104 and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server 104 for processing and generating the corresponding displays.

A computing device n-202, n-203 may send instructions, e.g., to output an indication of a change of barrier status, to control circuitry 210, 219 and/or 218 using user input interface 226.

User input interface 226 may be any suitable user interface, such as a remote control, trackball, keypad, keyboard, touchscreen, touchpad, stylus input, joystick, voice recognition interface, controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202, n-203 may transmit and receive content and data via I/O path 212, 220, and 221 respectively. For instance, I/O path 212, and/or I/O path 220, and/or I/O path 221 may include a communication port(s) configured to transmit and/or receive (for instance to and/or from content database 106 n-206), via communication network 208, content item identifiers, content metadata, natural language queries, and/or other data. Control circuitry 210 and/or 218 and/or 219 may be used to send and receive commands, requests, and other suitable data using I/O paths 212 and/or 220 and/or 221.

Figure 3:
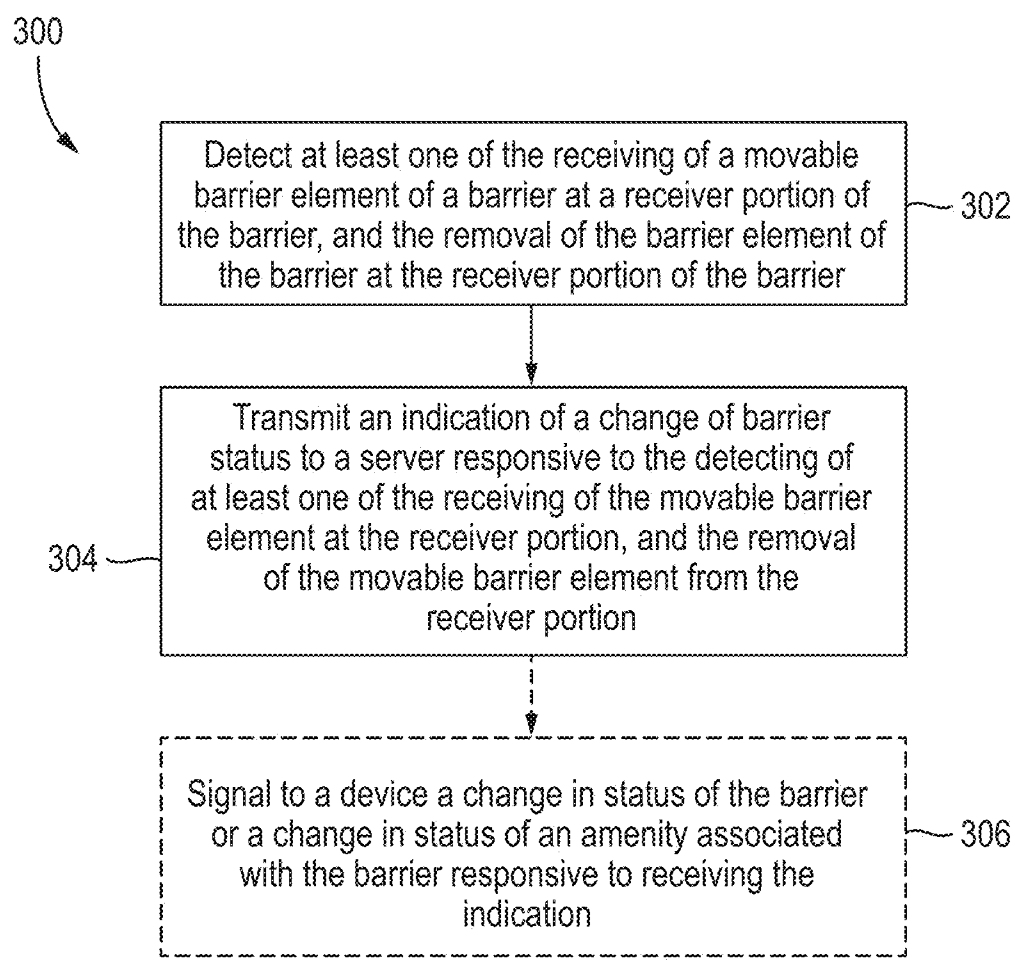
FIG. 3 is a flowchart representing a process for indicating a change of barrier status, in accordance with some examples of the disclosure.
Figure 4:
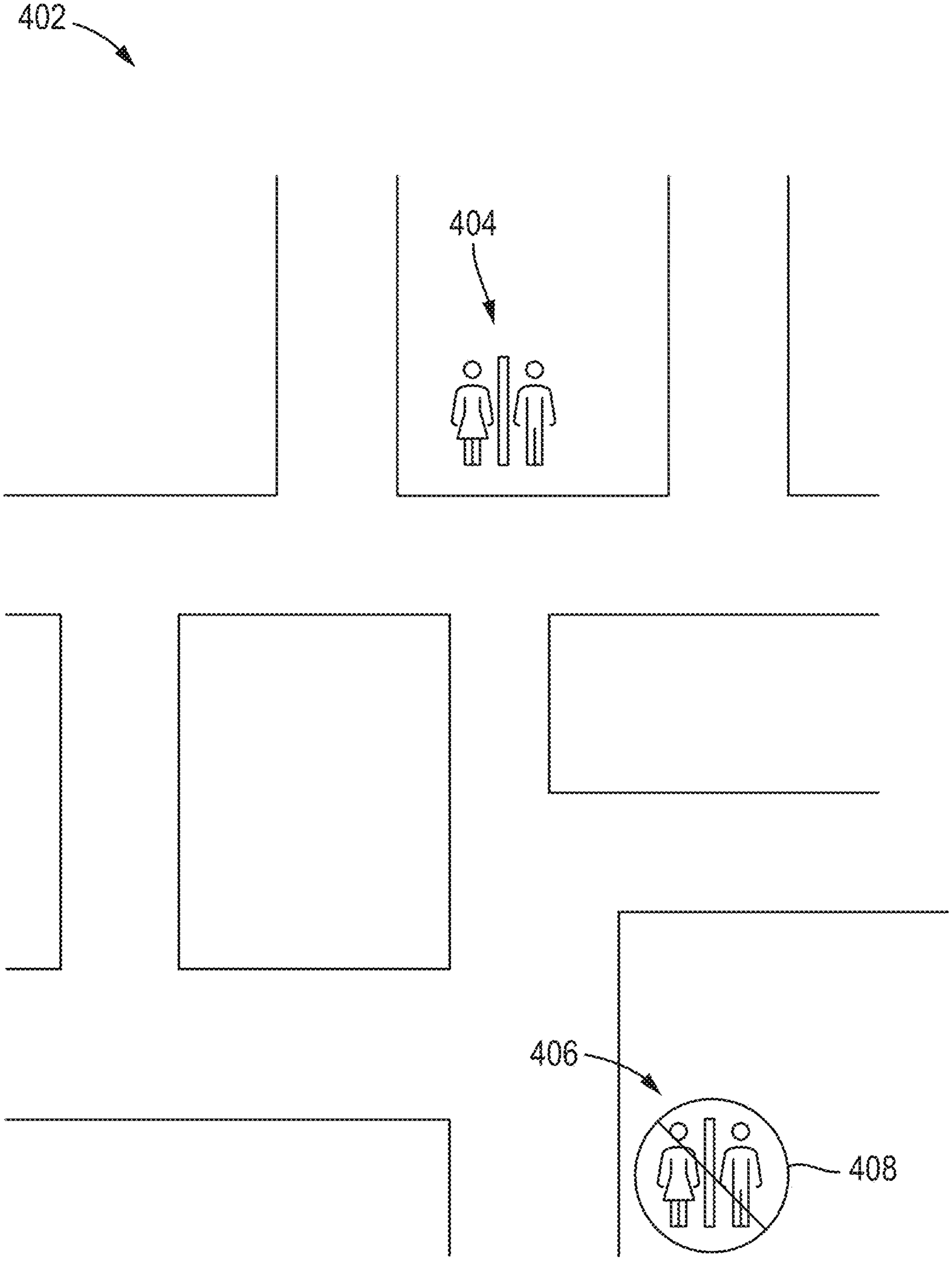
FIG. 4 illustrates a virtual map configured to indicate barrier status, in accordance with some examples of the disclosure.
Figure 5:
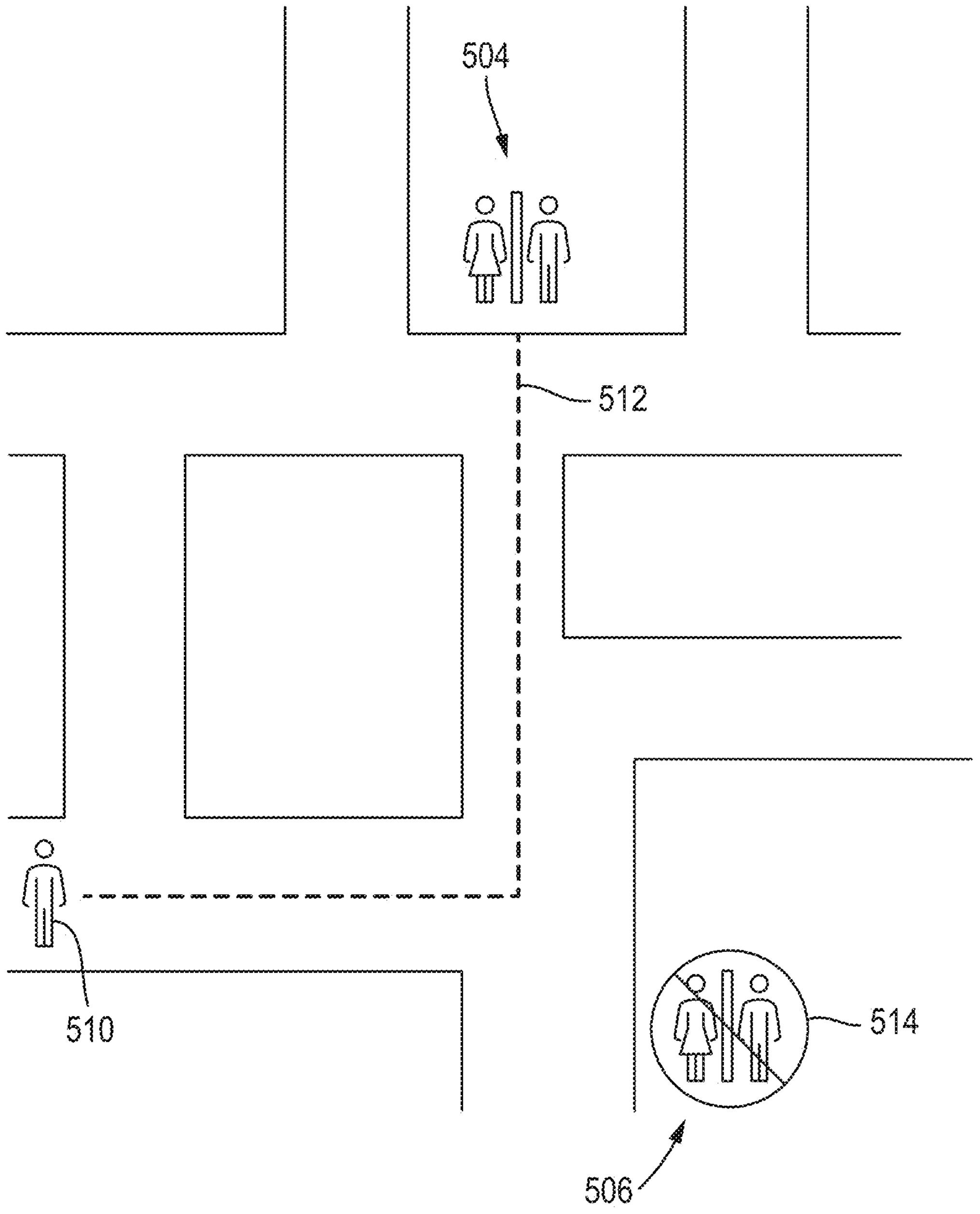
FIG. 5 illustrates a route mapped based on an indication of barrier status, in accordance with some examples of the disclosure.

FIG. 3 shows a flowchart representing an illustrative process 300 for indicating a change of barrier status, such as the barrier 101 shown in FIG. 1. FIG. 4 illustrates an example of the modification of a virtual map based on the status of barriers. FIG. 5 illustrates an example of a route output by a route mapping application based on the status of barriers. While the example shown in FIGS. 3 to 5 refers to the use of system 100, as shown in FIG. 1, it will be appreciated that the illustrative process 300 shown in FIG. 3, with reference to FIGS. 4 and 5, may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of the barrier 101, control circuitry of the user device 114, and control circuitry of server 104, working either alone or in some combination.

At 302, control circuitry, e.g., control circuitry of the barrier 101, detects at least one of the receiving of a movable barrier element 102 of the barrier 101 at a receiver portion 103 of the barrier 101, and the removal of the barrier element of the barrier 101 at the receiver portion 103 of the barrier 101. For example, a sensor 110 of the barrier 101 may be configured to detect at least one of the receiving of a movable barrier element 102 of the barrier 101 at a receiver portion 103 of the barrier 101, and the removal of the barrier element of the barrier 101 at the receiver portion 103 of the barrier 101. For example, the movable barrier element 102 and the receiver portion 103 may comprise cooperating formations, e.g., which are configured to engage and disengage. In the examples described herein, the barrier 101 is a belt barrier, where the movable barrier element 102 comprises a belt and a connecting portion 107, and where the belt is tensioned by a reel 109 which houses the belt when the barrier 101 is in an open position, as is described above in relation to FIG. 1. In general, an open position, or status, of the barrier is one in which a user may pass through the barrier, whereas a closed position, or status, of the barrier is one in which a user is prevented from passing through the barrier, for example, by connection of two portions of the barrier. It will be appreciated that the invention may be applied to other barrier mechanisms. For example, any barrier which requires a first portion to be connected to another portion may be configured to detect the connection of one portion of the barrier 101 with another portion of the barrier. Examples of other barriers to which the invention may be applied include barricades such as metal barricades, rope and stanchion barriers, water filled barriers, crowd control fences, concertina barriers, hinged barriers, and so on. In some examples, the barrier 101 is a barrier connectable to a wall(s). For example, the receiver portion 103 of the barrier 101 and a housing of the movable barrier element 102, or an end of the movable barrier element 102, may be fixedly connectable to a wall. In other examples, the barrier 101 may be free-standing, or connectable to the floor. For example, each of the receiver portion 103 and a housing or end of the movable barrier element 102 may be connected to a stanchion, where the stanchion may be connectable to the floor, or may be freestanding.

The detection of the receiving or removal of the movable barrier element 102 relative to the receiver portion 103 may be detected via the use of a passive element, such as a switch. For example, the passive element may be activated responsive to a change in the proximity of the movable barrier element 102 and the receiver portion 103, such as where the movable barrier element 102 and the receiver portion 103 are connectable by cooperating formations, in this example comprising a female connecting portion at the receiver portion 103 and a male connecting portion at the movable barrier element 102, where the engagement of the cooperating formations completes a circuit or causes an induction of current. The completion of the circuit may activate a transmitter 112. In some examples, a mechanical switch or lever may be provided as part of the cooperating formations, where these mechanical switches or levers within may be triggered or actuated when the movable barrier element 102 is connected to the receiver portion 103, for example, when a female formation of the cooperating formations is fully engaged with a male formation of the cooperating formations. The resulting physical movement or resistance may be sensed (e.g., by the sensor 110) to detect the connection. Any appropriate means may be used in order to detect the receiving of the movable barrier element 102 at the receiver portion 103.

At 304, control circuitry, e.g., control circuitry of the barrier 101, causes the barrier 101 to transmit, by a transmitter 112, an indication of a change of barrier status to a server 104 responsive to the detecting of at least one of the receiving of the movable barrier element 102 at the receiver portion 103, and the removal of the movable barrier element 102 from the receiver portion 103. As is described above, the detecting of a change in the connection between the movable barrier element 102 and the receiving portion may trigger the activation, or powering on, of the transmitter 112. The transmitter 112 may be powered by a battery (e.g., the electrical components of the barrier 101 may be battery powered), which may facilitate easy installation of the barrier 101 at various locations. Furthermore, as power to the transmitter 112 may only be required upon detection of the receiving of the movable barrier element 102 at the receiver portion 103 and/or the removal of the movable barrier element 102 from the receiver portion 103, and/or the detection may be performed using passive elements which may reduce energy consumption of the barrier, the battery life of elements of the barrier 101 may be prolonged.

The indication of the change of barrier status is an indication of a closed status when the movable barrier element 102 is received at the receiver portion 103, and the indication of the change of barrier status is an indication of an open status when the movable barrier element 102 is removed from the receiver portion 103. The transmitter 112 may be configured to indicate whether the barrier 101 has been closed or opened. For example, where a lever is engaged by reception of the movable barrier element 102 at the receiving portion (e.g., where the barrier 101 is in a closed state), the sensor 110 may detect the engagement of the lever and therefore determine that barrier 101 is closed, and the transmitter 112 may indicate that the barrier 101 is closed. Conversely, where the lever is disengaged by removal of the movable barrier element 102 from the receiving portion (e.g., where the barrier 101 is in an open state), the sensor 110 may detect that the barrier 101 is open, and the transmitter 112 may indicate that the barrier 101 is open. Alternatively, where the sensor 110 merely detects that a change of status occurs, for example, where the relative movement of the movable barrier element 102 and the receiving portion induces a current, the transmitter 112 may be configured to simply indicate that a change in status of the barrier 101 has occurred. For example, the server 104 may be configured to determine the new, current, status of the barrier 101 based on a stored (e.g., previous) status of the barrier 101, and the indication that the status of the barrier 101 has changed.

In some examples, the transmitter 112 is further configured to transmit an indication of the identity of the barrier 101 along with the indication of the status of the barrier 101. For example, the barrier 101 may be associated with a particular location, or a particular amenity. The transmitter 112 may therefore indicate the location of the barrier 101, or the amenity with which the barrier 101 is associated, when it sends the indication of a change in status of the barrier 101. Alternatively, the barrier 101 may comprise an identifier, such as a number, which may be associated with a particular location or amenity, where the server 104 may comprise information on the association of the identifier with a location or amenity, such that the server 104 may determine the location or amenity based on the identifier, thereby determining the open or closed status of the particular location or amenity. Thus, the transmitter 112 may further transmit metadata related to the barrier 101, such as an identifier, a location, or an amenity with which the barrier 101 is associated.

The location or amenity with which the barrier 101 is associated may be set upon installation of the barrier 101 at a particular location or proximity to an amenity. For example, the identity of a barrier 101 within a particular facility may be configured by a central facility management system with which the barrier 101 is in communication (e.g., hosted at the server 104 or another server 104 with which the barrier 101 is in communication), where, for example, the name of a barrier 101 may be set to correspond to its location or corresponding amenity. As is described above, this association may be stored within a content database 106 accessible by the server 104, and/or may be stored at the barrier 101.

In some examples, the barrier 101 is in communication with the server 104 via an Internet of Things (IoT) connection. For example, the barrier 101 may be connected to the server 104 via a router or gateway, which may be connected to a plurality of devices (such as other barriers). Advantageously, IoT technologies are low cost in terms of hardware and data transmission, which may reduce the cost of providing and operating barriers as described herein.

At 306, control circuitry, e.g., control circuitry of the server 104, signals to a device 114 a change in status of the barrier or a change in status of an amenity associated with the barrier 101 responsive to receiving the indication. Alternatively, in some examples, the server 104 or another server with which the server 104 is in communication may modify a website to indicate the status of the barrier 101. For example, a website may indicate amenities available at a facility, where the status of the amenity may be updated based on the received signal. The metadata regarding the barrier (e.g., the indication of status of the barrier along with the location and/or amenity with which the barrier is associated) may additionally comprise information regarding the facility type, location, and contact details. The metadata may be used to provide information on alternative facilities that may be available without requiring additional data from other sources. This information may be stored, for example, at the server, and sent to the device along with the indication in change of status of the barrier or a change in status of an amenity associated with the barrier.

In some examples, the system, such as the system of FIG. 1 or 2 further comprises the device 114. The device 114 may be configured to output a notification 116 indicating a change in status of the barrier 101 or a change in status of an amenity associated with the barrier 101 responsive to receiving the signal indicating the status of the barrier 101 or the status of the amenity associated with the barrier 101. In some examples, the device 114 comprises any of or any combination of a digital sign (such as signage at a facility indicating the availability or location of amenities), a user device, an audio output device (such as a speaker system), and a further server. A notification 116 may comprise a modification of existing information regarding the amenity to indicate the new status of the amenity or location, or may comprise a statement or image output which conveys the new status of the amenity or location, such as a statement which interrupts a train signage indicating the status of a train to provide the information (e.g., "The lifts are out of order at the next station"). The device 114 may be a user device, such as a laptop, smartphone, smartwatch, tablet, computer, smart speaker, and so on, which, in response to receiving a signal indicating the change in status of the barrier 101 (or an amenity), may output a notification 116 to the user device, such that a user may be notified of the change in status of the barrier 101 or amenity.

In some examples, the barrier 101 is located within a facility. For example, a facility may be a place, a building, or a series or combination of buildings, such as associated structures such as train stations. As is described above, barriers within a facility may be linked to a central facility management system which is operated through the server 104 (e.g., the server 104 comprises or is the facility management system) or is in communication with the server 104, and receives information on the change of status of barriers within the facility. Where barriers are associated with a facility, the device 114 may be associated with, for example, an authorized person of a facility, such as a building manager, who is notified of changes to barriers within the facility. Authorized users may be configured by the building management system above, which may output notifications 116 to authorized devices which are located within the facility, or are associated with the facility management system, such as facility owned devices distributed to employees, or which are linked to the same network as the facility management system, for example, by sharing the same Wi-Fi network. In some examples, users may subscribe to updates relating to a facility, where the user may be notified of changes to barriers within the facility. For example, a user may be notified when an amenity is no longer available. This may be particularly beneficial for users who require certain facilities, such as lifts where a user requires the accessibility provided by a lift. The user may be notified based on a subscription of a user to a particular facility (e.g., by a user subscribing to receive updates related to a particular facility, such as a train station), and/or may be notified based on their proximity to the facility (e.g., when a user is in the vicinity of, or located within, a facility, for example connected to the Wi-Fi of a facility, they may receive updates regarding the status of barriers, or amenities, in the facility). FIG. 1 illustrates an example of such a notification 116 output at a user device 114.

The signal received at the device 114 may be used by an application of the device 114 in order to output an indication of the status of the barrier 101 at the device 114. For example, a virtual mapping application of the device 114 may be configured to indicate the status of an amenity associated with the barrier 101 when the status is a closed status. For example, when a viewer interacts with a virtual map through the device 114, and views a location in which the barrier 101 is provided, the map may indicate the status of the barrier 101 (e.g., showing the word "CLOSED" in relation to a facility when the barrier 101 associated with that facility is closed). The virtual mapping application may be a map associated with the facility management system, such as a map produced and controlled by the facility management system.

FIG. 4 illustrates an example of a virtual map comprising a plurality of buildings, and indicating the status of amenities associated with barriers such as those described above. In particular, FIG. 4 illustrates the status of toilet amenities 404, 406 within a particular facility 402 (e.g., a shopping center), as determined by virtue of the processes described above. As is shown in this example, a first amenity 404 is shown as being "open", as the amenity is shown with nothing to indicate its closure. In contrast, a second amenity 406 is shown as being "closed", as a prohibition sign 408 is provided over the second amenity 406. It will be appreciated that any appropriate means may be used to illustrate the status of an amenity, such as any wording or images that convey the current status. In some examples, both the open and closed configuration may be conveyed, for example, through use of the words "open" and "closed" attributed to the appropriate amenities (or locations), or just an "open" configuration may be illustrated.

In a further example, a route mapping application of the device 114 is configured to utilize the status of the barrier 101 or an amenity associated with the barrier 101 when outputting a route. For example, where the system 100 indicates that a particular route or access is not available, the route mapping application may determine and output to a user device 114 an alternative route that does not require passing that barrier. In some examples, where the route mapping application receives a request to search and route to a particular amenity, if an amenity (e.g., the nearest amenity) matching the request is indicated to be closed, the route mapping application may select a different amenity matching the request to use as the target location for a route.

FIG. 5 illustrates an example of a virtual map comprising a plurality of buildings overlayed with a suggested route, such as that generated by a routing application. In particular, in this example, the routing application has received a user request to locate and route to the nearest toilet amenities. The routing application has located two toilet amenities, a first amenity 504 and a second amenity 506. The first amenity 504 of this example is known by the routing application to be open, whereas the second amenity of this example is known by the routing application to be closed, by virtue of the processes described above. While the user 510 of this example is in closer proximity to the second amenity 506, as this amenity is not currently accessible to the user 510, the routing application instead outputs a suggested route 512 to the first amenity. The route 512 shown here is illustrated in conjunction with a map, and further illustrates the status of the amenities (e.g., the closed status of the second amenity 506 is illustrated by a prohibition sign 514). However, it will be appreciated that any appropriate means may be used to convey the suggested route, such as a list of instructions, or a user perspective view, rather than a map view. In some cases, the status of the amenities may not be explicitly indicated to the user, rather, their status may be utilized by the routing application to guide users to facilities that are currently accessible without the user being aware of the status of the amenities.

Figure 6:
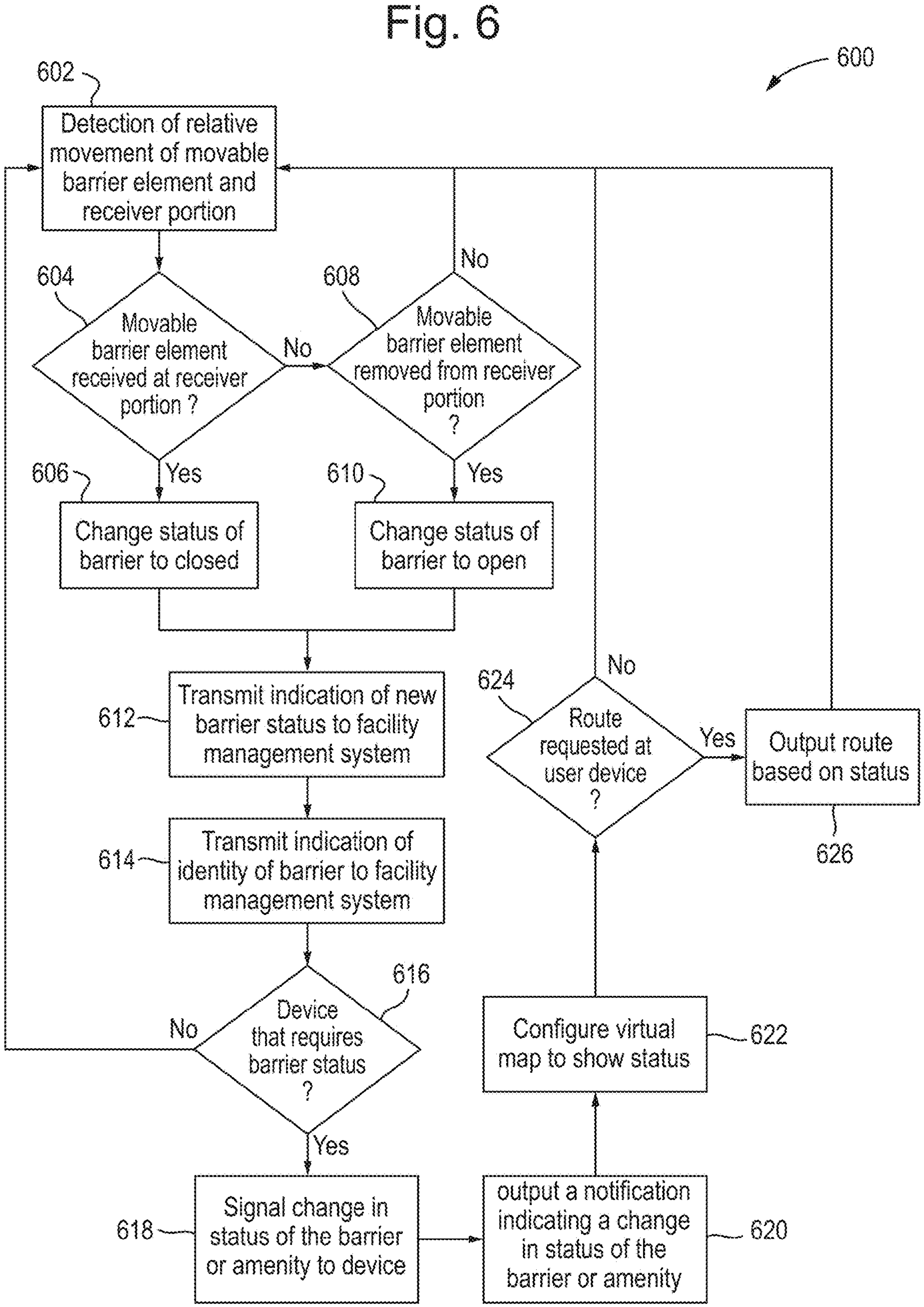
FIG. 6 illustrates a flowchart representing a process for indicating barrier status, in accordance with some examples of the disclosure.

FIG. 6 shows a flowchart representing an illustrative process 600 for indicating a change of status of the barrier 101. The barrier may be a belt barrier as described above, and may be comprised in a facility.

At 602, the relative movement the movable barrier element and the receiver portion is detected. For example, a sensor may be configured to detect the relative movement of the movable barrier element and the receiver portion (e.g., the receiving of the movable barrier element at the receiver portion and the removal of the movable barrier element from the receiver portion). At 604, it is determined, for example, by control circuitry, such as control circuitry of the barrier 101 and/or the sensor, whether the movable barrier element has been received at the receiver portion (e.g., whether the barrier has been closed). Where it is determined that the movable barrier element has been received at the receiver portion (YES at 604), at 606, the status of the barrier is changed, or set, to a closed status. Where it is determined that the movable barrier element has not been received at the receiver portion (NO at 604), at 608 it is determined whether the movable barrier element has been removed from the receiver portion (e.g., whether the barrier has been opened). Where it is determined that the movable barrier element has been removed from the receiver portion (YES at 608), at 610, the status of the barrier is changed, or set, to an open status. Once the status of the barrier has been set, at 612, an indication of the newly set barrier status is transmitted (e.g., by a transmitter, which may be battery powered, and may power up responsive to the detection of the relative motion of the receiver portion and the movable barrier element) to a facility management system (e.g., a server, for example, via an Internet of Things connection). Then (or at the same time, or prior to step 612), at 614, the identity of the barrier is transmitted, or sent, to the facility management system. For example, the identity of the barrier may indicate a location of the barrier, or amenity with which the barrier is associated, or may simply comprise an identifier such as a number that enables the facility management system to determine the location of the barrier, or amenity with which the barrier is associated. Then, at 616, it is determined whether a device which requires information on the status of the barrier exists (for example, a device belonging to an authorized person, a subscribed user, a user in the vicinity of the barrier or facility, a sign associated with the facility management system, a user device, an audio output device, a further server, and so on). Where no such device is detected (NO at 616), the process moves back to 602. Where it is determined that such a device exists (YES at 612), at 618, a change in status of the barrier or amenity is signaled to the device(s). At 620, the device then outputs a notification indicating a change in status of the barrier or amenity. At 622, the device additionally configures a virtual map to show the status of the barrier or amenity (e.g., via a virtual mapping application, or output on a website). At 624, it is further determined whether a user has requested a suggested route, for example, from a route mapping application. Where a user has requested such a route (YES at 624), at 626, a route is output based on the status of the barrier or amenity (for example, avoiding the barrier or amenity where the status is a closed status). The process moves back to 602. Where a user has not requested such a route (NO at 624), the process moves back to 602.

The actions or descriptions of FIG. 6 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A system comprising an access control barrier and a server, wherein:

the access control barrier comprises:

a movable barrier element;

a receiver portion configured to receive the movable barrier element;

a sensor configured to detect at least one of the receiving of the movable barrier element at the receiver portion and a removal of the movable barrier element from the receiver portion; and a transmitter configured to transmit an indication of a change of barrier status to the server, wherein the server is responsive to the sensor detecting at least one of the receiving of the movable barrier element at the receiver portion and the removal of the movable barrier element from the receiver portion; and wherein the server is configured to receive the indication of the change of barrier status, and the server is further configured to signal to a user device dynamic information regarding a change in status of an amenity associated with the access control barrier responsive to receiving the indication, wherein the server is in communication with a facility management system, and wherein a route mapping application of a user device is configured to utilize the dynamic information regarding the status of the amenity associated with the access control barrier when outputting a route.

2. The system of claim 1, wherein the system further comprises the user device, and wherein the user device is configured to output a notification indicating a change in status of the access control barrier or a change in status of the amenity associated with the access control barrier responsive to receiving the signal indicating the status of the access control barrier or the status of the amenity associated with the access control barrier.

3. The system of claim 1, wherein the user device comprises at least one of a digital sign, an audio output device, and a further server.

4. The system of claim 1, wherein the access control barrier is located within a facility, and wherein the user device is associated with at least one of an authorized person of the facility, a user subscribed to receive updates related to the facility, and a user located in a vicinity of the facility.

5. The system of claim 1, wherein the access control barrier is located within a facility, and wherein the server comprises or is in communication with the facility management system.

6. The system of claim 1, wherein the access control barrier is located within a facility, and wherein the user device is comprised in or is in communication with the facility management system.

7. The system of claim 1, wherein a virtual mapping application of the user device is configured to indicate the status of the access control barrier or the amenity associated with the access control barrier when the status is a closed status.

8. The system of claim 1, wherein the route mapping application of the user device is configured to utilize the status of the access control barrier or the amenity associated with the access control barrier when outputting a route.

9. The system of claim 1, wherein the indication of the change of barrier status is an indication of a closed status when the movable barrier element is received at the receiver portion, and the indication of the change of barrier status is an indication of an open status when the movable barrier element is removed from the receiver portion.

10. The system of claim 1, wherein the access control barrier is a belt barrier, and the movable barrier element comprises a belt and a connecting portion configured to connect the belt to the receiver portion.

11. The system of claim 1, wherein the access control barrier is associated with at least one of a location and an amenity.

12. The system of claim 1, wherein the transmitter is battery powered.

13. The system of claim 1, wherein the access control barrier is in communication with the server via an Internet of Things connection.

14. The system of claim 1, wherein the route mapping application is configured to output an alternative route that does not require passing the access control barrier when the status of the amenity is a closed status.

15. The system of claim 1, wherein the route mapping application is configured to select a different amenity as a target location for a route when the amenity associated with the access control barrier is indicated to be closed.

16. The system of claim 1, wherein the amenity associated with the access control barrier comprises at least one of an elevator, an escalator, and a toilet facility.

17. The system of claim 1, wherein the access control barrier is a vehicle access control barrier.

18. A method of operation of an access control barrier, the method comprising:

detecting at least one of the receiving of a movable barrier element of a barrier at a receiver portion of the barrier, and a removal of a barrier element of the barrier at the receiver portion of the barrier; and transmitting an indication of a change of barrier status to a server responsive to the detecting of at least one of the receiving of the movable barrier element at the receiver portion, and the removal of the movable barrier element from the receiver portion;

signaling, by the server, to a user device dynamic information regarding a change in status of an amenity associated with the access control barrier responsive to receiving the indication, wherein the server is in communication with a facility management system; and utilizing, by a route mapping application of a user device, the dynamic information regarding the status of the amenity associated with the access control barrier when outputting a route.

19. The method of claim 18, further comprising outputting, by the route mapping application, an alternative route that does not require passing the access control barrier when the status of the amenity is a closed status.

* * * * *